United States Patent [19]

Stapleton et al.

[11] Patent Number: 5,365,822
[45] Date of Patent: Nov. 22, 1994

[54] CUTTING GUIDE

[76] Inventors: Michael F. Stapleton; John Stapleton, both of 112 E. Grand Blvd., Detroit, Mich. 48207

[21] Appl. No.: 121,918

[22] Filed: Sep. 17, 1993

[51] Int. Cl.⁵ .................................. B27B 9/04
[52] U.S. Cl. ........................ 83/745; 83/520; 83/614
[58] Field of Search ........... 83/745, 520, 743, 468.4, 83/614

[56] References Cited

U.S. PATENT DOCUMENTS

| | | | |
|---|---|---|---|
| 2,913,926 | 11/1959 | Hammond | 83/520 X |
| 4,073,206 | 2/1978 | Gratsch et al. | 83/614 X |
| 4,224,855 | 9/1980 | Des Roches | 83/745 |
| 4,356,748 | 11/1982 | Tilton | 83/745 |
| 4,381,103 | 4/1983 | Ferdinand et al. | 83/745 X |
| 4,867,425 | 9/1989 | Miraglia, Jr. | 83/745 X |

*Primary Examiner*—Richard K. Seidel
*Assistant Examiner*—Kenneth E. Peterson
*Attorney, Agent, or Firm*—Hugh E. Smith

[57] ABSTRACT

A portable and adjustable cutting guide especially designed to minimize chipping of the cut edges on cuts made cross-grain on doors, panels or the like when utilizing a circular saw, a jig saw or a router. The device includes a thin, rigid, preferably plastic, rectangular plate having one long, perfectly straight edge defining a cutting guide line and a slightly raised surface member extending parallel with but spaced from the edge defining the cutting guide line, the raised surface member functioning as an edge stop for the platform of the saw being used with the guide. Preferably the plate is provided with at least one clamp on the opposite side thereof from the edge defining the cutting guide line to permit securing of the plate to the work piece so that it presses down on the surface being cut to minimize chipping thereof. The cutting guide device may also be supplied with a power supply box to facilitate use of the cutting saw and, if desired, with a work light to illuminate the cutting area.

2 Claims, 4 Drawing Sheets

CUTTING GUIDE

BACKGROUND OF THE INVENTION

1. Field of the Invention

The present invention relates to a cutting guide and more particularly pertains to such a guide which may be easily moved to and secured to a work piece to be cut.

2. Description of the Prior Art

The use of cutting guides is known in the prior art. More specifically, such guides heretofore devised and utilized for the purpose of cutting wood panels or the like are known to consist basically of familiar, expected and obvious structural configurations, notwithstanding the myriad of designs encompassed by the crowded prior art which have been developed for the fulfillment of countless objectives and requirements. Typical guides are shown in U.S. Pat. Nos. 4,892,021; 4,811,643; 4,989,485; and 4,995,288.

In this respect, the cutting guide according to the present invention substantially departs from the conventional concepts and designs of the prior art, and in so doing provides an apparatus primarily developed for the purpose of easily being positioned on the work piece; holding down the edge to be cut to minimize chipping thereof; and readily adjustable for any angle of cut.

Therefore, it can be appreciated that there exists a continuing need for a new and improved cutting guide which can be utilized with portable hand tools. In this regard, the present invention substantially fulfills this need.

SUMMARY OF THE INVENTION

In view of the foregoing disadvantages inherent in the known types of cutting guides now present in the prior art, the present invention provides an improved cutting guide construction wherein the same can be utilized with portable hand tools. As such, the general purpose of the present invention, which will be described subsequently in greater detail, is to provide a new and improved cutting guide which has all the advantages of the prior art devices and none of the disadvantages.

To attain this, the present invention essentially comprises a portable and adjustable cutting guide especially designed to minimize chipping of the cut edges on cuts made cross-grain on doors, panels or the like when utilizing a circular saw, a jig saw or a router which comprises a thin, rigid (preferably plastic) rectangular plate having one long, perfectly straight edge defining a cutting guide line and a slightly raised surface member extending parallel with but spaced from said edge defining the cutting guide line, said raised surface member functioning as an edge stop for the platform of the saw being used with the guide. Preferably said plate is provided with clamping means on the opposite side thereof from the edge defining the cutting guide line to permit securing said plate to the work piece so that it presses down on the surface being cut to minimize chipping thereof. The cutting guide device may also be supplied with a power supply box to facilitate use of the cutting saw and, if desired, with a work light to illuminate the cutting area.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved cutting guide which has all the advantages of the prior art devices and none of the disadvantages.

It is another object of the present invention to provide a new and improved cutting guide which may be easily and efficiently manufactured and marketed.

It is a further object of the present invention to provide a new and improved cutting guide which is of a durable and reliable construction.

An even further object of the present invention is to provide a new and improved cutting guide which is susceptible of a low cost of manufacture with regard to both materials and labor, and which accordingly is then susceptible of low prices of sale to the consuming public, thereby making such devices economically available to the buying public.

Still yet another object of the present invention is to provide a new and improved cutting guide which provides in the apparatuses of the prior art some of the advantages thereof, while simultaneously overcoming some of the disadvantages normally associated therewith.

Still another object of the present invention is to provide a new and improved cutting guide especially useful for cross-grain cutting.

Yet another object of the present invention is to provide a new and improved cutting guide which is easily portable.

Even still another object of the present invention is to provide a new and improved cutting guide for use with small portable hand tools.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
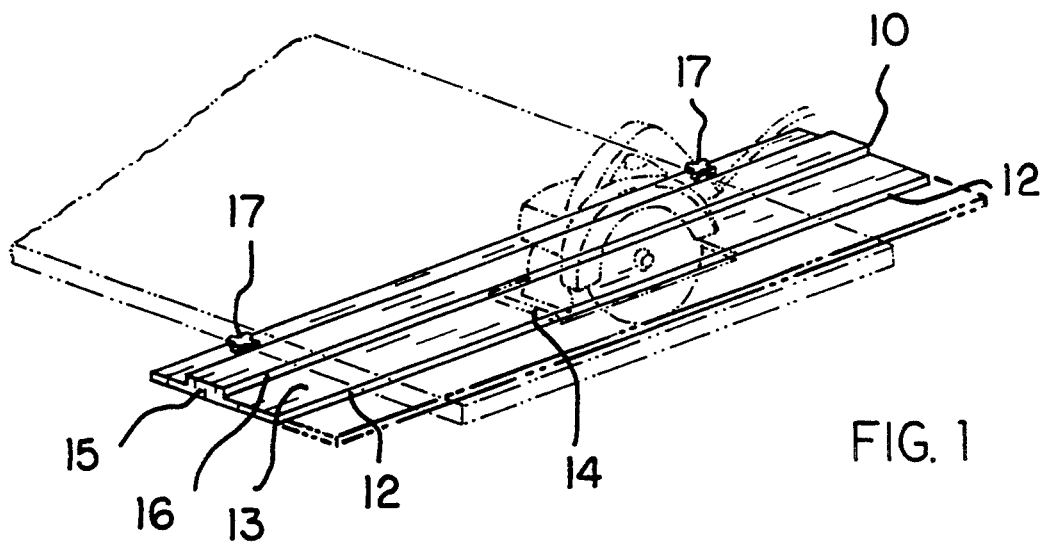
FIG. 1 is a perspective view of the present device in operating position on a work piece.

With reference now to the drawings, and in particular to FIG. 1 thereof, a new and improved cutting guide device embodying the principles and concepts of the present invention and generally designated by the reference numeral 10 will be described.

The cutting guide device 10 has a thin, rigid, rectangular plate member 11 with a straight edge 12 thereon which serves to define a cutting line for a saw (shown here in broken lines). Spaced back from such edges 12 a sufficient distance to provide a planar surface 13 of a width such as to accept the platform 14 of the cutting saw thereon, is a raised surface mender 15 having at least one edge 16 thereof parallel to edge 11 and extending for the same distance, i.e. end-to-end of plate member 11. Raised member 15, preferably formed integrally with plate member 11, functions as an edge stop for the platform 14 of the cutting saw while straight edge 12 defines the path of the cutting blade thereof. To define a distance between the straight edge 12 and the raised member 15, a user may simply cut the rectangular plate member 11 with the saw, thereby customizing the cutting guide 10 to that particular saw. In addition, the rectangular plate member 11 may be of any length necessary to facilitate an intended use thereof. However, the preferred embodiment of the present invention desires a length of either four or eight feet.

Clamping means 17 are provided to hold plate member 11 in tight engagement with the work piece (shown in broken lines) so as to minimize chipping of the cut edge of such work piece. Although clamping means 17 are provided, the cutting guide device 10 may be constructed without clamping means, whereby conventional C-clamps may be utilized to secure the device to a work-piece.

Figure 2:
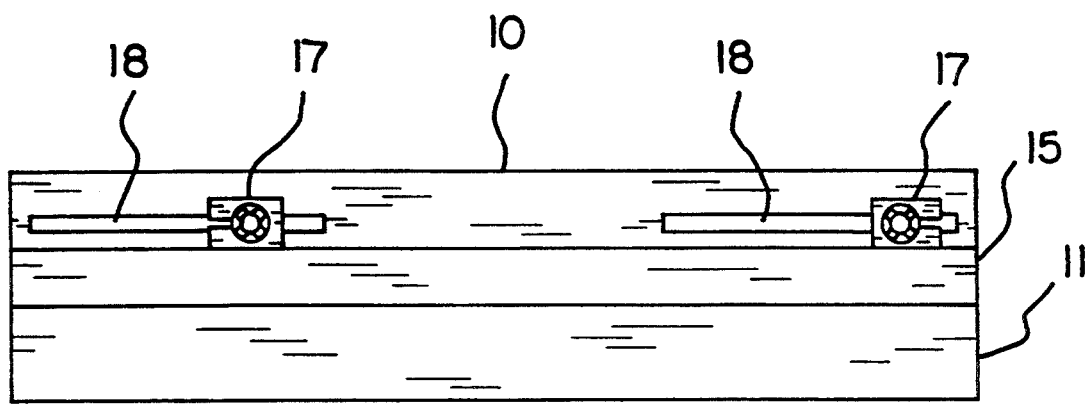
FIG. 2 is a top plan view of the device of FIG. 1.

FIG. 2 shows the cutting guide device 10 and illustrates that clamp means 17 are slidable in slot 18 for adjustment to varying widths of work-pieces.

Figure 3:
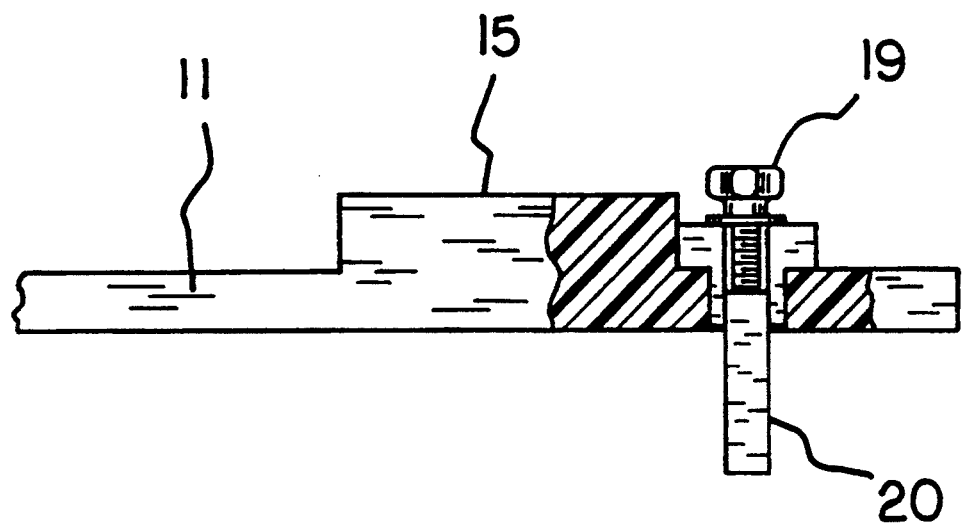
FIG. 3 is a partially sectional front view of one edge of the device shown in FIG. 2.
Figure 4:
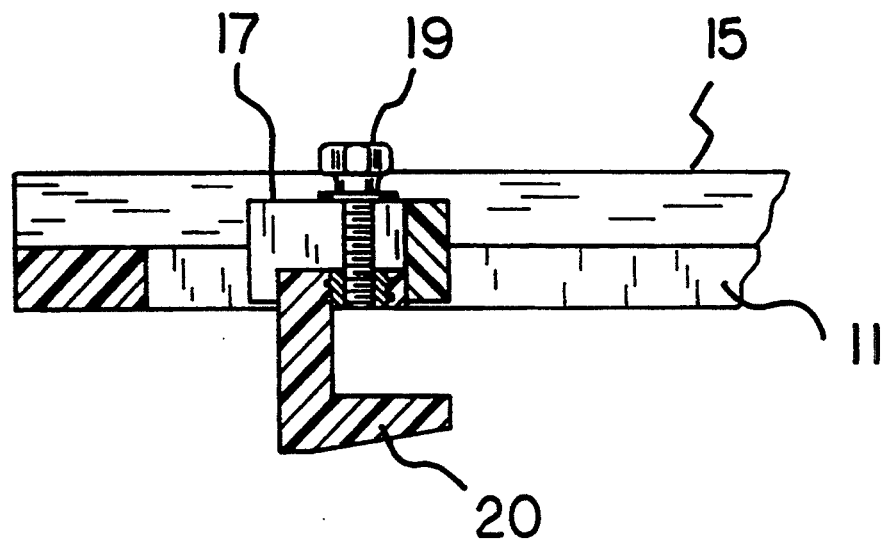
FIG. 4 is a partially sectional side view of the same edge as in FIG. 3.

FIGS. 3 and 4 illustrates details of the clamping means 17 showing a bolt member 19 extending down through plate 11 and engaging in threaded relationship to an L-shaped clamp 20 which will engage the under side of the work-piece while holding plate 11 tightly against the top surface thereof.

Figure 5:
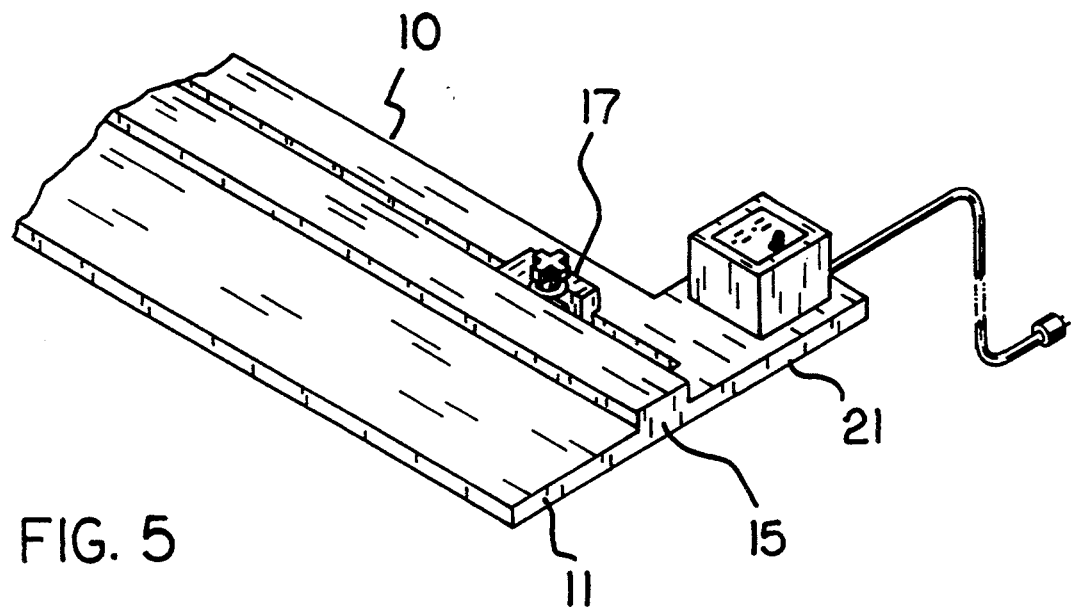
FIG. 5 is a perspective view of a modified version of the present invention.
Figure 6:
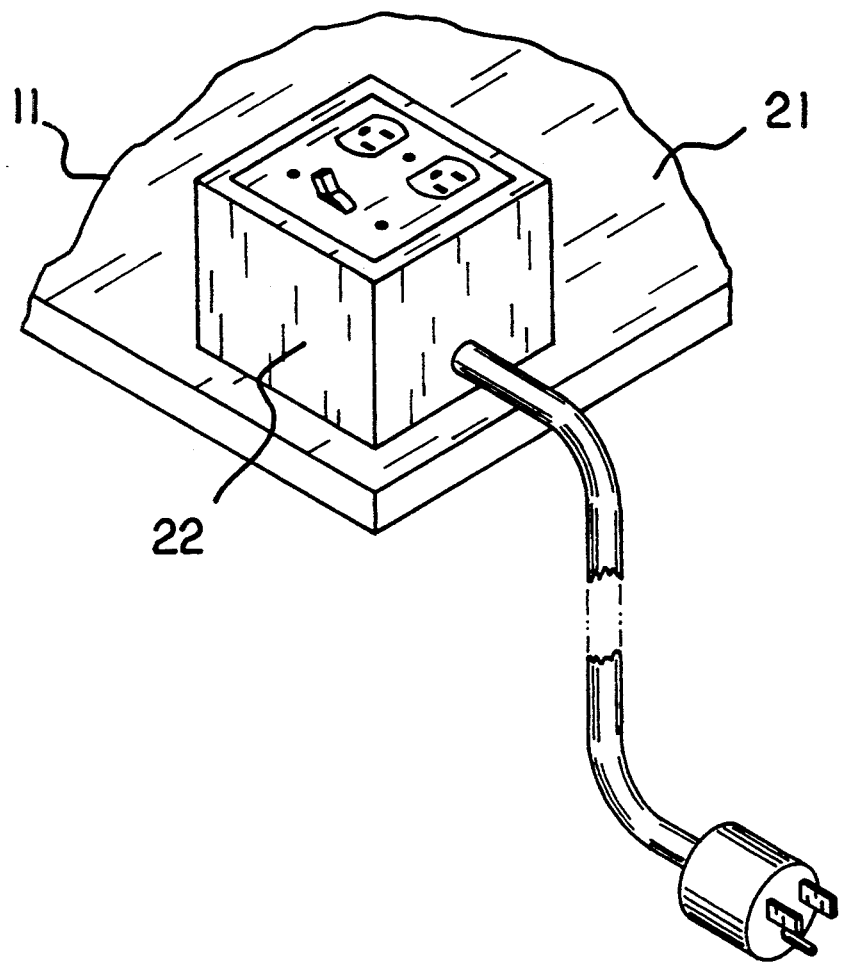
FIG. 6 is an enlarged perspective view of a portion of the device of FIG. 5.

FIGS. 5 and 6 illustrate a second embodiment of the device 10 of the previous drawings wherein the portion of plate 11 through which clamping means 17 extends either is wide enough or has, as shown here, an extending projection 21 thereof to accommodate a power supply 22 mounted thereon.

Figure 7:
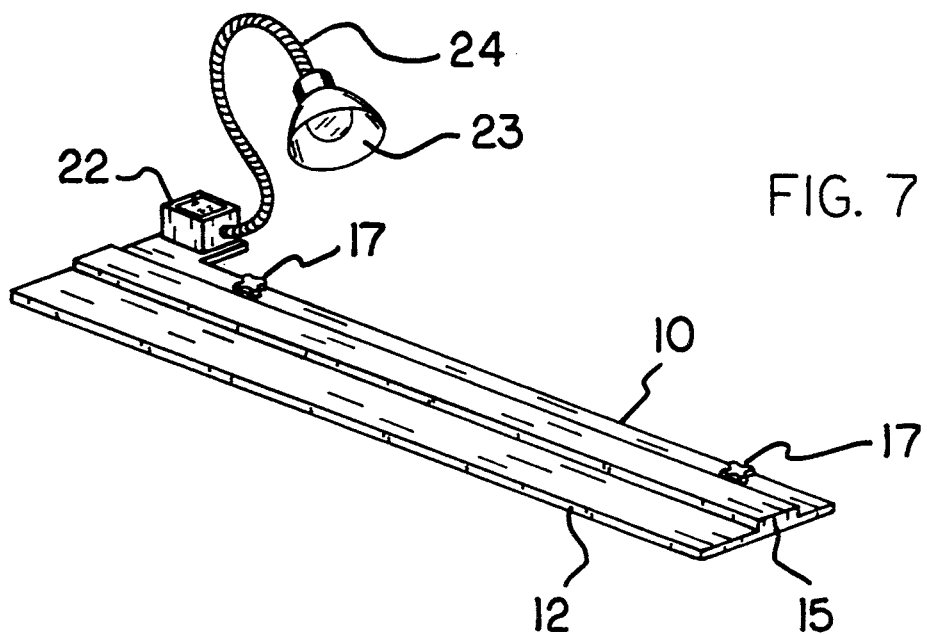
FIGS. 7 and 8 show perspective views of still a further modification of the device of FIGS. 5 and 6.
Figure 8:
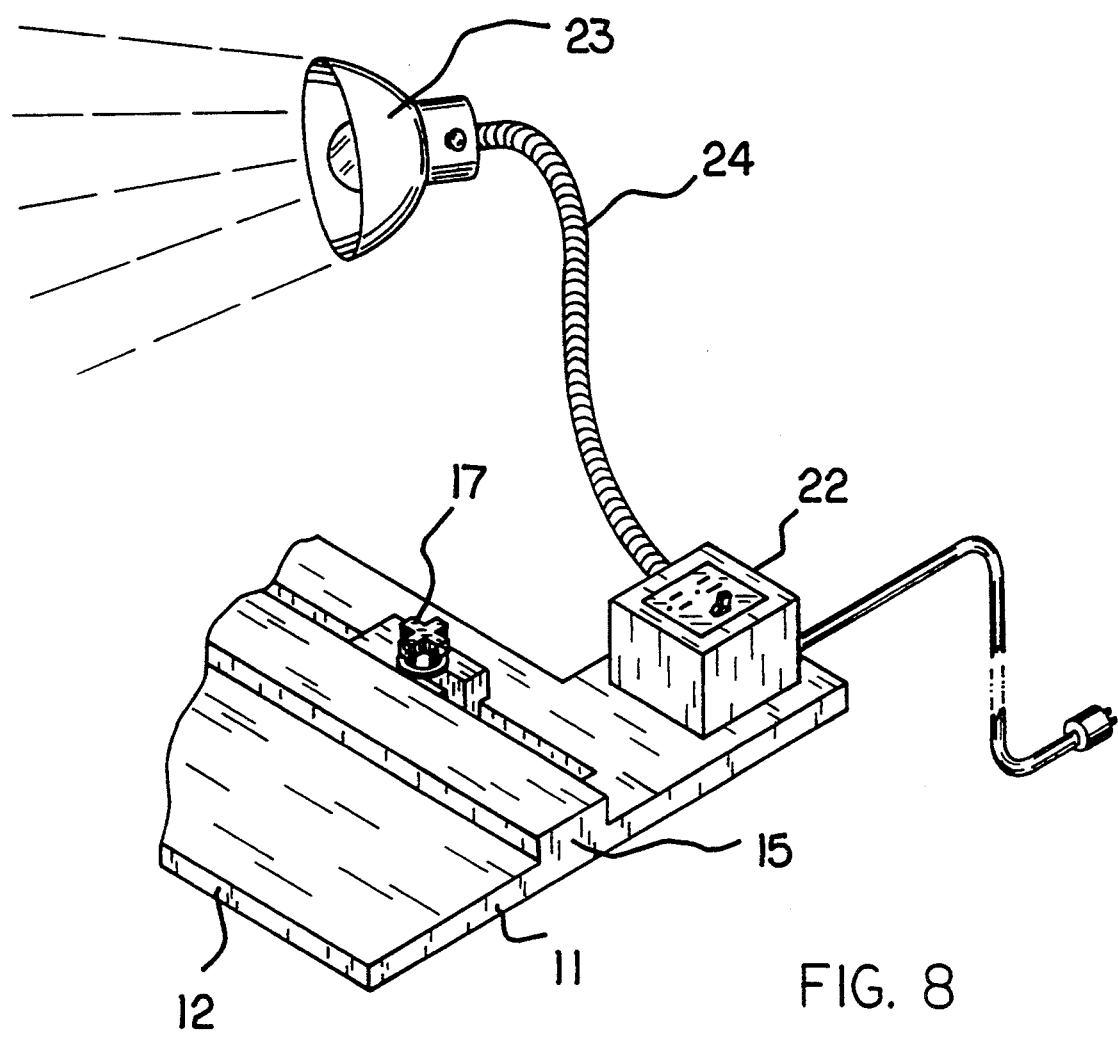

FIGS. 7 and 8 show a third embodiment of the device 10 of FIGS. 5 and 6 wherein a work light 23 is mounted on the power supply 22 by means of a bendable, semi-rigid flex cable 24 to direct light down onto the cutting line on the work-piece.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A cutting guide comprising:
   a rigid plate member, said plate member being substantially elongated and having a pair of opposed sides with a substantially flat, planar surface defined between said opposed sides of said plate member, said plate member having a plate member longitudinal axis, a plate member center area, and first and second plate member ends, said plate member being shaped so as to define a first elongated slot aligned substantially parallelly with said plate member longitudinal axis and extending from proximate said plate member first end towards said plate member center area, said plate member being further shaped so as to define a second elongated slot aligned substantially parallelly with said plate member longitudinal axis and extending from proximate said plate member second end towards said plate member center area;
   a raised surface member integrally connected to said plate member along said planar surface thereof between said opposed sides, said raised surface member being substantially parallelly aligned with said plate member longitudinal axis, said raised surface member having a pair of opposed, straight edges with a first of said straight edges being operable to engage a guide edge of a platform of a cutting saw having a saw blade so as to guide said cutting saw along said first straight edge;

a first clamping means comprising a first L-shaped clamp, and a first bolt member extending through said first elongated sloe from said planar surface to threadably engage said first L-shaped clamp, whereby tightening of said first bolt member effects clamping of said first clamp against a workpiece;

a second clamping means comprising a second L-shaped clamp, and a second bolt member extending through said second elongated slot from said planar surface to threadably engage said second L-shaped clamp, whereby tightening of said second bolt member effects clamping of said second clamp against said workpiece, said first and second clamps being selectively slidable within said slots parallel to said longitudinal axis from said ends toward said center area of said plate member;

wherein said plate member is formed of a material capable of being cut by said cutting saw, whereby said plate member can be cut by said saw so as to define a new side of said plate member characterized by a distance between said new side and said first straight edge of said raised surface member being equal to a distance between said guide edge of said platform and said saw blade of said cutting saw.

2. A cutting guide comprising:

a rigid plate member, said plate member being substantially elongated and having a pair of opposed sides with a substantially flat, planar surface defined between said opposed sides of said plate member, said plate member having a plate member longitudinal axis, a plate member center area, and first and second plate member ends, said plate member being shaped so as to define a first elongated slot aligned substantially parallelly with said plate member longitudinal axis and extending from proximate said plate member first end towards said plate member center area, said plate member being further shaped so as to define a second elongated slot aligned substantially parallelly with said plate member longitudinal axis and extending from proximate said plate member second end towards said plate member center area;

a raised surface member integrally connected to said plate member along said planar surface thereof between said opposed sides, said raised surface member being substantially parallelly aligned with said plate member longitudinal axis, said raised surface member having a pair of opposed, straight edges with a first of said straight edges being operable to engage a guide edge of a platform of a cutting saw having a saw blade so as to guide said cutting saw along said first straight edge;

a first clamping means comprising a first L-shaped clamp, and a first bolt member extending through said first elongated slot from said planar surface to threadably engage said first L-shaped clamp, whereby tightening of said first bolt member effects clamping of said first clamp against a workpiece;

a second clamping means comprising a second L-shaped clamp, and a second bolt member extending through said second elongated slot from said planar surface to threadably engage said second L-shaped clamp, whereby tightening of said second bolt member effects clamping of said second clamp against said workpiece, said first and second clamps being selectively slidable within said slots parallel to said longitudinal axis from said ends toward said center area of said plate member;

a power supply mounted to a portion of said plate member; and, a work light mounted to said power supply, said work light having a bendable flex cable permitting selectable positioning of said work light relative to said plate member;

wherein said plate member is formed of a material capable of being cut by said cutting saw, whereby said plate member can be cut by said saw so as to define a new side of said plate member characterized by a distance between said new side and said first straight edge of said raised surface member being equal to a distance between said guide edge of said platform and said saw blade of said cutting saw.

* * * * *